(12) United States Patent
Mordukhovich et al.

(10) Patent No.: US 9,416,332 B2
(45) Date of Patent: Aug. 16, 2016

(54) GEAR ASSEMBLY AND GEAR OIL COMPOSITION

(75) Inventors: Gregory Mordukhovich, Bloomfield Hills, MI (US); James L. Linden, Rochester Hills, MI (US); Andrew M. Mance, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 635 days.

(21) Appl. No.: 12/947,853

(22) Filed: Nov. 17, 2010

(65) Prior Publication Data

US 2012/0118100 A1    May 17, 2012

(51) Int. Cl.
  *C09K 5/10* (2006.01)
  *F16H 57/04* (2010.01)
  *C10M 171/00* (2006.01)

(52) U.S. Cl.
  CPC ....... *C10M 171/002* (2013.01); *C10M 171/005* (2013.01); *F16H 57/0417* (2013.01); *F16H 57/0457* (2013.01); *F16H 57/0483* (2013.01); *C10M 2203/1006* (2013.01); *C10M 2205/0285* (2013.01); *C10M 2205/173* (2013.01); *C10M 2207/0215* (2013.01); *C10M 2207/0225* (2013.01); *C10M 2207/0406* (2013.01); *C10M 2211/022* (2013.01); *C10N 2240/04* (2013.01); *C10N 2240/046* (2013.01); *Y10T 74/2188* (2015.01); *Y10T 74/2189* (2015.01)

(58) Field of Classification Search
  CPC ........ F16H 57/04; F16H 57/0417; C09K 5/10
  USPC ...................... 74/606 A, 607; 252/68; 477/34
  See application file for complete search history.

(56) References Cited

U.S. PATENT DOCUMENTS

| | | | | |
|---|---|---|---|---|
| 3,073,183 | A | * | 1/1963 | Kelley ............................... 477/1 |
| 2005/0101497 | A1 | | 5/2005 | Saathoff et al. |
| 2005/0215389 | A1 | * | 9/2005 | Shimizu et al. ............... 475/331 |
| 2006/0178279 | A1 | * | 8/2006 | Sullivan et al. ............... 508/463 |
| 2007/0006675 | A1 | * | 1/2007 | Marla et al. ..................... 74/424 |
| 2009/0105035 | A1 | * | 4/2009 | Shimizu et al. ............... 475/331 |
| 2010/0038174 | A1 | * | 2/2010 | Mordukhovich et al. .... 184/6.12 |

FOREIGN PATENT DOCUMENTS

| | | |
|---|---|---|
| EP | 1503113 A2 | 2/2005 |
| JP | 2010223261 A | 10/2010 |

OTHER PUBLICATIONS

German Office Action dated Mar. 2, 2016; Application No. 10 2011 118 467.1; Applicant: GM Global Technology Operations LLC; 5 pages.

* cited by examiner

*Primary Examiner* — Douglas Mc Ginty
(74) *Attorney, Agent, or Firm* — BrooksGroup

(57) ABSTRACT

One embodiment may include a gear assembly comprising at least one pair of meshing gears situated inside a gear case having a sump portion and a wall portion. A gear oil mixture may be disposed at least in the sump portion. At least one gear is immersed partially or fully in the oil mixture. The oil mixture comprises a hydrocarbon oil base and a coolant having an endothermic liquid/vapor transition at a temperature between the lower and upper operating temperatures of the gear assembly.

32 Claims, 1 Drawing Sheet

GEAR ASSEMBLY AND GEAR OIL COMPOSITION

TECHNICAL FIELD

The field to which the disclosure generally relates includes gear assembly and gear oil.

BACKGROUND

Gear oil is typically used in transmissions, transfer cases, and differentials in automobiles, trucks, and other machinery. Gear oil is usually of a high viscosity in order to better protect the gears from wear, corrosion and thermal damages. In the absence of an oil pump, the gear oil can be picked up by a portion of the lowermost gears bathed in an oil sump and transferred to the rest of the gear train through the rotating action of the gears. A high viscosity gear oil, on the other hand, creates viscous drag and churning loss leading to inefficiencies in vehicle operation.

SUMMARY OF ILLUSTRATIVE EMBODIMENTS OF THE INVENTION

One embodiment may include a gear oil mixture comprising a hydrocarbon oil base and a coolant having an endothermic (liquid to vapor) phase transition at a temperature between the upper and lower operating temperatures of the gear oil. In another embodiment the gear oil mixture may include a performance additive system that may include antiwear compounds, antioxidants, viscosity modifiers, anti-foamants, and other similar performance enhancing additives. The viscosity of the gear oil mixture is generally lower than the viscosity of the oil base.

Another embodiment may include gear assembly comprising at least one pair of meshing gears situated inside a gear case having a sump portion and a wall portion. A gear oil mixture is disposed at least in the sump portion. At least one gear is immersed at least partially in the gear oil mixture. The gear oil mixture comprises a coolant having an endothermic liquid/vapor transition between the lower and upper operating temperatures of the gear assembly.

Another embodiment includes a method comprising: providing gear assembly comprising at least one pair of meshing gears and a gear case having a sump portion and a wall portion; disposing in the sump portion a gear oil comprising a coolant having an endothermic liquid/vapor transition between the upper and lower operating temperatures of the gear assembly; and immersing at least part of a gear in the gear oil.

Other illustrative embodiments of the invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the invention will become more fully understood from the detailed description and the accompanying drawings, wherein.

DETAILED DESCRIPTION OF ILLUSTRATIVE EMBODIMENTS

Figure 1:
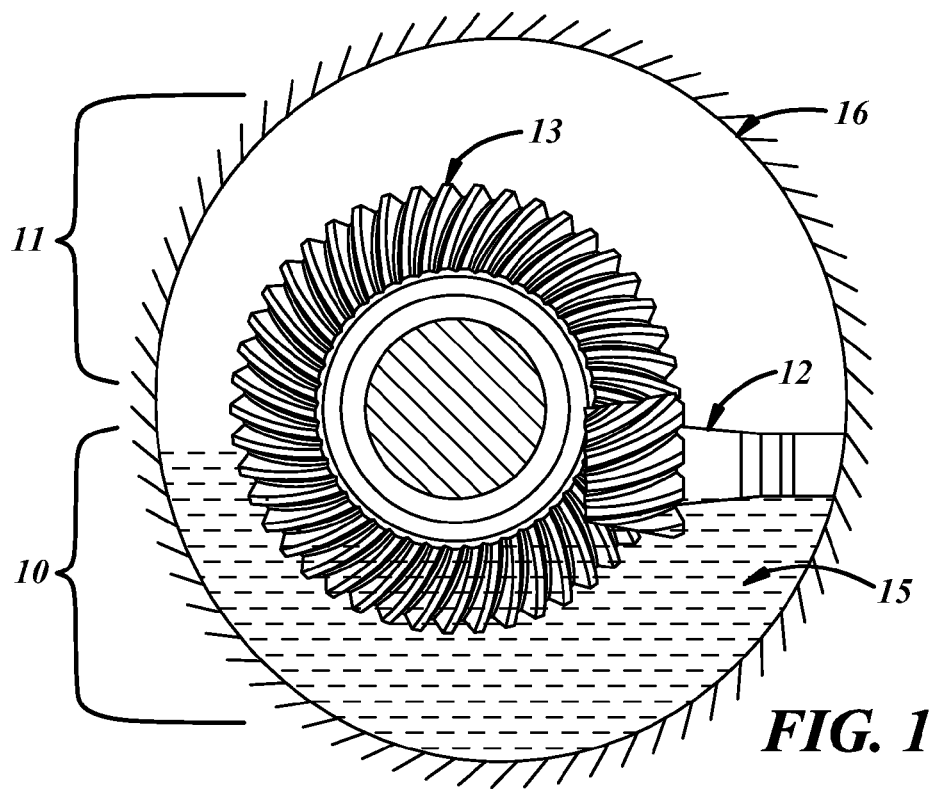
FIG. 1 is a schematic drawing of an illustrative gear assembly including a pinion and ring gear.

The following description of the embodiment(s) is merely illustrative in nature and is in no way intended to limit the invention, its application, or uses.

One embodiment may include a gear assembly comprising at least one pair of meshing gears enclosed in a gear case comprising a sump portion and a wall portion. A gear oil mixture may be disposed in at least the sump portion. One or more gears of the assembly are at least partially immersed in the gear oil. The gear oil mixture comprises a coolant having an endothermic liquid/vapor transition between the lower and upper operating temperatures of the gear assembly.

In a rear axle portion of an automotive vehicle, a propeller drive shaft is linked to gears that mesh with other gears enclosed in a gear case. The gears are directly linked or coupled to the axles of the rear wheels. Through this illustrative gear assembly, the propeller drive shaft is able to deliver a necessary torque to drive the rear wheels of the motor vehicle. A gear oil mixture comprising a coolant is disposed inside the gear case to provide lubrication and protection of the gears. The gear assembly is also configured as described below to allow effective heat management for improved energy efficiency, lighter weight and less wear or damage to the gears.

The gears and pinions inside the gear assembly may be of hypoid, helical, or other spiral bevel gear types. A hypoid gear may be a type of spiral bevel gear whose axis does not intersect with the axis of the meshing gear. The shape of a hypoid gear may be typically a revolved hyperboloid. The hypoid gear may place the pinion off-axis to the crown wheel (ring gear) which allows the pinion to be larger in diameter and have more contact area. The pinion can be offset to the bottom of the crown wheel. This provides for longer tooth contact and allows the propeller shaft that drives the pinion to be lowered. Hypoid gears are not only strong, but operate more quietly and can be used for higher reduction ratios. A spiral bevel gear with conical shape or other designs may also be used in the gear assembly. A spiral bevel gear with helical teeth design may produce less vibration and noise than conventional straight-cut or spur-cut gears with straight teeth. In helical gears, the leading edges of the teeth are not parallel to the axis of rotation, but are set at an angle. Since the gear is curved, this angling causes the tooth shape to be a segment of a helix. The angled teeth engage more gradually. This causes helical gears to run smoothly and quietly. The helical and hypoid gear assemblies may be used in high speed and large power transmissions, vehicle rear axle differentials, manual transmissions or where noise abatement is important. There is, however, a greater degree of sliding friction and extreme pressures between the meshing teeth in hypoid and helical gears that demand a high level of protection. The gear oil mixture and construction of the gear case described below provide improved thermal and mechanical protections for the gear assemblies.

The gear oil is a mixture that may comprise a hydrocarbon oil base, a performance additive system, and a coolant having an endothermic phase transition at a temperature between the upper and lower operating temperatures of the gear oil. The viscosities of the coolant and the oil mixture are lower than the viscosity of the oil base and performance additive combination or a similar conventional gear oil without the coolant. The oil base of the mixture is generally of a high viscosity.

A petroleum hydrocarbon oil base or a synthetic oil base may be used in the oil mixture. A petroleum oil base may include a mineral oil base stock derived from crude oil. A petroleum oil base may comprise aliphatic and/or aromatic hydrocarbon molecules having relatively high boiling points. The boiling point of an oil base may be typically greater than about 150°-200° C. A synthetic oil base may be used where a greater resistance to shear breakdown is needed. Synthetic oil bases may be derived from a Group III mineral base oil, Group IV, or Group V non-mineral bases. Additionally, the synthetic oil base may also include classes of lubricants like synthetic esters as well as others like GTL (Methane Gas-to-Liquid) (Group III) and polyalpha-olefins (Group IV). A hydrocarbon gear oil base may have a viscosity at low temperatures from several thousands to several hundreds of thousands centipoises (cP). In some cases, pinion gear failures have been known to occur at gear oil viscosities of greater than 150,000 cP. Various viscosity grades reach a viscosity of 150,000 cP at temperatures ranging from −12° C. to −55° C.

The coolant in the gear oil mixture may include any chemical compounds having an endothermal liquid/vapor transition at a temperature between the lower and upper operating temperatures of the gear oil or the gear assembly. The coolant typically has a viscosity lower than that of the oil base. The viscosity of a coolant may be less than about 100 centipoises (cP) measured using a Brookfield viscometer at 25° C. Typical viscosity of the coolant may range from about 1 cP to about 30 cP at 25° C. The coolant may have a melting temperature less than about −40° C. or may be completely soluble in the oil base between −40° C. and 200° C. or between −40° C. and 150° C. The coolant typically has a heat of vaporization ($\Delta H$) at its endothermal transition temperature of at least 0.25 kilo-joules per gram (kJ/g). Coolants with $\Delta H$ values greater than about 0.3 or 0.4 kJ/g may provide greater efficiency in protecting the gear assembly against overheating and extreme pressures. The coolant may comprise any polar molecules having a strong intermolecular dipole interaction force and/or hydrogen bonding interaction. Additionally, a lipophilic group, such as an aliphatic or aromatic hydrocarbon group, may be included in the coolant molecule to provide solubility in or miscibility with the hydrocarbon oil base. The coolant may comprise a molecule having a strong polar group and a lipophilic group. The polar group may include, but is not limited to, hydroxyl, thiol, carbonyl, carboxylic, sulfonate, amine, amide, and/or imide groups. An organic alcohol compound or an organic compound having at least one hydroxyl group, for example, may be used as the coolant. The organic alcohol may further include at least one ether group in the molecular structure. Examples of suitable organic alcohol compounds may include, but is not limited to, methoxytriglycol, diethylene glycol monobutyl ether, ethylene glycol monobutyl ether, diethylene glycol monoethyl ether, 1,2-butanediol, nonyl alcohol, dipropylene glycol n-butyl ether, dipropylene glycol methyl ether, dipropylene glycol monopropyl ether, propylene glycol methyl ether, propylene glycol n-butyl ether, propylene glycol propyl ether, isobutyl alcohol, 1-butanol, 2-chloroethanol, 1-hexanol, 1,2-propanediol, propylene glycol phenyl ether, ethylene glycol mono-propylether, diethylene glycol methyl ether, 4-methyl-2-pentanol, 1-methyl cyclohexanol, 2-methyl-1-pentanol, and/or n-pentanol The following table lists some of the organic alcohols and their melting temperatures, boiling temperatures, and heat of vaporization at the endothermic liquid/vapor transition temperature.

| | Melting Point, ° C. | Boiling Point, ° C. | Heat of vaporization at boiling point, $\Delta H$, kJ/g |
|---|---|---|---|
| Methoxytriglycol | −44 | 250 | 0.301 |
| Diethylene glycol monobutyl ether | −68 | 230 | 0.276 |
| Ethylene glycol monobutyl ether | −77 | 171 | 0.348 |
| Diethylene glycol monoethyl ether | −43 | 201 | 0.35 |
| 1,2-butanediol | | 190.5 | 0.586 |
| Dipropylene glycol n-butyl ether | −75 | 230 | 0.252 |
| Dipropylene glycol methyl ether | −83 | 190 | 0.267 |
| Dipropylene glycol monopropyl ether | −75 | 213 | 0.265 |
| Propylene glycol methyl ether | −97 | 120 | 0.435 |
| Propylene glycol n-butyl ether | −80 | 171 | 0.32 |
| Propylene glycol propyl ether | −80 | 149 | 0.369 |
| 1-butanol | −90 | 117.7 | 0.584 |
| Propylene glycol phenyl ether | 19 | 243 | 0.319 |
| Ethylene glycol mono-propylether | −90 | 150 | 0.383 |
| Diethylene glycol methyl ether | −69 | 194 | 0.369 |
| 2-chloroethanol | −89 | 128 | 0.514 |
| 1-Hexanol | −52 | 157 | 0.436 |
| 1,2-Propanediol | −60 | 187 | 0.689 |

The viscosities of the organic alcohol compounds listed in the table range from about 1 cP to about 25 cP measured at 25° C. The coolant may include a mixture of different coolant molecules to provide a particular vaporization profile for a specific application. A mixture of different coolants having different endothermic transition temperatures may be used to provide heat protection for a specific temperature range.

Since the viscosity of the coolant is significantly lower than that of the oil base, the gear oil mixture may typically have a viscosity lower than that of the corresponding oil base or similar conventional gear oils without the coolant. Furthermore, the viscosity of the gear oil mixture typically increases when the amount of coolant in the mixture decreases, and vice versa. During start-up or at a low operating temperature environment, the gear oil mixture exhibits relatively lower viscosity than similar conventional gear oils without the coolant. As a result, the gear assembly comprising the oil mixture has a lower viscous drag and lower churning loss. As the operating temperature rises after an extended period of operating time or in a high operating temperature environment, the coolant in the oil mixture vaporizes, resulting in less coolant in the oil mixture and an increase in gear oil viscosity. The increase in viscosity due to coolant vaporization compensates at least partially for the viscosity drop due to rise in temperature, thus ensuring the persistence of a thick oil layer on the operating gears for optimal protection at elevated temperatures. A layer of gear oil at a sufficient thickness is necessary to act as a separating film between surfaces of adjacent moving parts to minimize their direct contact for lower friction and better protection against mechanical wear. The thickness of the separating oil layer typically increases with the viscosity of the oil.

Similarly, the coolant can also provide protection against localized overheating and extreme pressure in the contact zone between a pair of meshing gears. The coolant vaporization can absorb significant amounts of heat generated in the localized contact zone and thus effectively reduce localized overheating due to friction and extreme pressure. Although the Applicant does not wish to be bound to or by any particular theory, it is believed that overheating and/or extreme pressure at the gear contact zone causes coolant vaporization and volume expansion in the gear oil layer trapped between two contact surfaces. The volume expansion creates a so-called "counter pressure" that acts to separate the contact surfaces of two meshing gears. Such counter pressure and localized coolant vaporization effectively reduces the overheating, contact pressure and gear friction. Under certain operating conditions where overheating occurs only in the high pressure contact zone between two meshing gears, the coolant may only vaporize in the localized contact zone. The coolant thus provides good thermal protection against potential damages such as gear scoring, a common damage mark on the pressure face of gear teeth or in the bore section caused by instantaneous fusing of the mating surfaces due to overheating and extreme pressure.

The gear oil mixture may also contain other additives that offer extreme temperature and pressure protection to further reduce wear, pitting, spalling, scoring, scuffing and other types of potential damages. Additives that protect against oxidation, thermal degradation, rust, copper corrosion and foaming may also be included. Extreme pressure (EP) additives are additives for gear oils with a role of decreasing wear of the parts of the gears exposed to very high pressures. EP additives may include, but are not limited to, organic sulfur, phosphorus, zinc or chlorine compounds, including sulfur-phosphorus and sulfur-phosphorus-boron compounds, which chemically react with the metal surface under high pressure conditions thus protecting the gear surface from localized high flash or extreme temperature and pressure. Examples of EP additives include lead salts of fatty acids, organic thiols, elemental sulfur, zinc dithiophosphate, chlorinated hydrocarbons, esters of chlorendic acid, polymeric esters, polysulfides, molybdenum compounds (such as molybdenum disulfide and molybdenum dithiocarbamates), trichloromethyl phosphine acids, organic esters of $\alpha$-acetoxy-$\beta,\beta,\beta$-trichloroethyl phosphonic acid, trichloromethyl esters of phosphoric acid, trichloromethyl derivates of sulfur, trichloroacetoxy compounds, esters or amine salts of chlorendic acid, and 1,2,3,4,7,7-hexachloro-5-dimethylbicyclo[2.2.1]-2-heptene. Anti-wear (AW) additives are additives for the gear oil mixture that prevent metal-to-metal contact between parts of gears. AW additives may include, but are not limited to, organic zinc compounds, phosphorous compounds, and halocarbons. Examples of AW additives include zinc dithiophosphate, zinc dialkyl dithio phosphate, tricresyl phosphate, chlorinated parafins, glycerol mono oleate, stearic acid, and colloidal polytetrafluoethylene. An EP active may also act as an AW additive in certain cases. Other additives may include any known detergents, antioxidants, colorants, corrosion inhibitors, viscosity modifiers, and anti-foaming agents.

The endothermic liquid/vapor transition temperature of the coolant falls between the lower and upper operating temperatures of the gear assembly or the gear oil. The lower and upper operating temperatures are the temperatures at which the gear assembly or gear oil can operate normally for an extended period of time. The upper and lower temperatures vary depending on the gear assembly design, gear material, and end-use configuration. Typically, the lower operating temperature is between about −60° C. and about 40° C., and the upper operating temperature is between about 100° C. and about 200° C. The endothermal transition temperature of the coolant is typically 10° C. to 100° C. less than the upper operating temperature. As described above, an organic alcohol having an endothermic liquid to vapor transition, or a boiling point, of about 80° C. to about 190° C., or 80° C. to about 160° C., may be used as the coolant.

The coolant may be present in the gear oil mixture at various concentrations and/or amounts depending on the chemical nature of the coolant, operating temperature range of the gear assembly, and other components in the gear oil. Typically, a coolant at 0.1% to 20%, or 1% to about 10% by weight based on the total weight of the oil mixture may be used. For example, 50 ml (milli-liter) of propylene glycol methyl ether, a coolant, may be mixed with a hydrocarbon oil base including typically additives to form a 2 liter gear oil mixture.

FIG. 1 is a schematic drawing of an illustrative automotive gear assembly (e.g., rear differential gear assembly). The gear assembly comprises gears 12 (pinion gear) and 13 (ring gear) situated in a gear case 16. The gear case 16 has a sump portion 10 and a wall portion 11. The gears are partially immersed in a gear oil mixture 15 disposed in the sump portion 11. The gear oil mixture 15 comprises the coolant as described above. During normal operation, the rotational action of the gears not only agitates the gear oil mixture 15 in the sump portion, but also picks up and transfers the gear oil mixture throughout the gears in the assembly. In low operating temperature environments, the gear oil comprising the coolant has a lower viscosity than a similar conventional gear oil base without the coolant. As a result, the gear oil mixture affords lower viscous drag and less churning loss, and thus improves the energy efficiency of the assembly. In a high temperature environment or after an extended period of operation, the gear assembly may approach the endothermic transition temperature of the coolant. At such an elevated temperature, the coolant in the gear oil undergoes an endothermic liquid to vapor phase transition. Extreme pressure in a contact zone of two meshing gears may also create localized high temperatures that trigger coolant vaporization. Significant amounts of the coolant may vaporize into the headspace of the gear case at the wall portion 11, leaving behind the liquid gear oil with less coolant volume. Due to its large heat of vaporization ($\Delta H$), the coolant absorbs a significant amount of heat directly from the operating gears and/or the sump portion, effectively preventing overheating of the gears and the oil mixture. Furthermore, vaporization of the coolant reduces coolant quantity in the gear oil and increases the gear oil viscosity. The viscosity increase due to coolant vaporization offsets the viscosity drop due to rise in temperature, thus ensuring the persistence of a thick oil layer over the operating gears for optimal protection. The coolant vapor in the headspace may be cooled by the wall portion of the gear case, and condensed into a liquid coolant. The condensed liquid coolant can flow back to the sump portion under the influence of gravity and be mixed into the oil mixture by the rotational action of the gear(s). The wall portion of the gear case may comprise a thermally-conductive material, such as metal, configured to efficiently conduct heat away from the gear assembly and direct the flow of condensed coolant liquid back to the sump portion. The wall portion may comprise a thin layer of steel, aluminum or other metal alloys. The wall portion may also include mechanical channels or generally down sloped surfaces to direct the flow of condensed liquid back to the sump section. The wall portion may further include a heat sink, external fan, or other heat removing components or structures. The processes of coolant vaporization, condensation, and re-mixing with the gear oil forms a beneficial cycle that effectively removes heat from the operating gears, and protects the gears from excessive wear at elevated temperatures and pressures. The gear case may be substantially closed to prevent evaporative loss of the coolant vapor to the external environment.

The gear assembly may include a heat exchanger and/or a condenser. In many cases, the heat exchanger also acts as a condenser that cools the coolant vapor and condenses the vapor into its liquid form.

Figure 2:
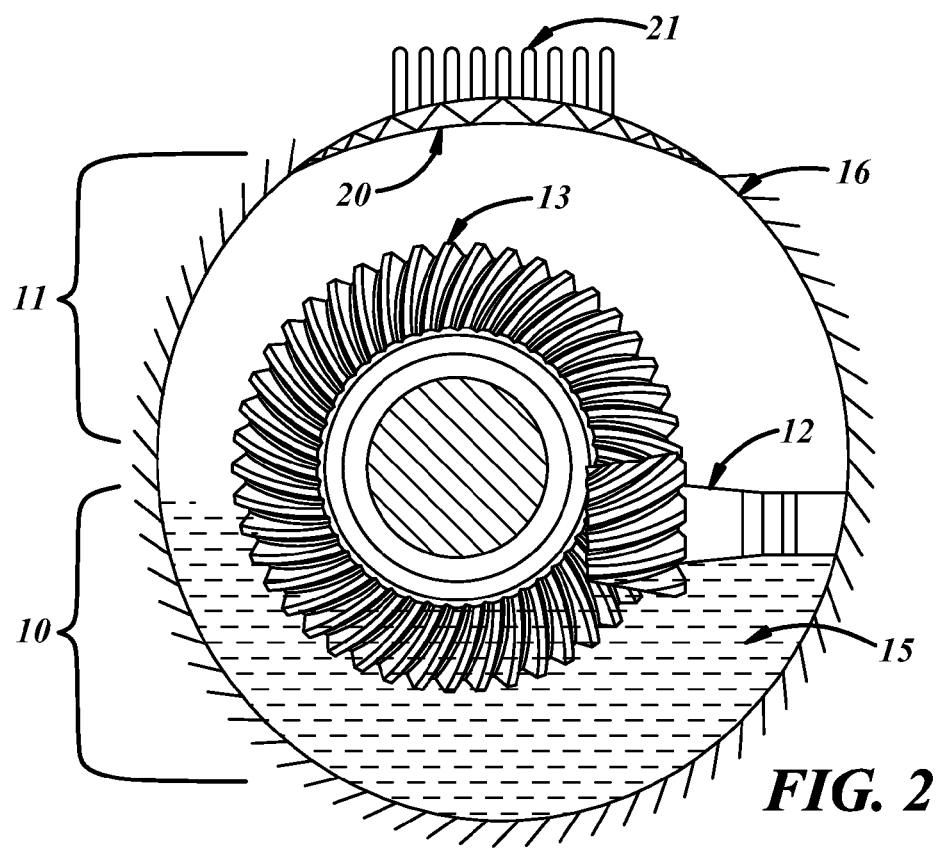
FIG. 2 is a schematic drawing of an illustrative gear assembly including a heat exchanger and a fin portion.

FIG. 2 is a schematic drawing of an illustrative gear assembly similar to that of FIG. 1 but including a heat exchanger 20 and a fin portion 21. The heat exchanger 20 may be any known heat exchangers or condensers that can be constructed and arranged to fit in the headspace of the gear assembly. For example, the heat exchanger can be a metal coil, metal mesh, high surface area three-dimensional metal structures with channels, dents, spikes, or voids, or coil filled with heat conductive liquid. The fin portion 21 may comprise an array of heat conductive fins (such as metal fins) extended from the exterior surface of the gear case. The extended exterior surface of fins significantly improves the efficiency of heat dissipation into the surrounding environment.

The gear assembly may also include a pressure regulator. As the coolant vaporizes at elevated temperatures, the pressure inside the gear case may rise. The pressure inside the gear case also affects the vaporization temperature of the coolant. A pressure regulator can prevent excessive pressure build-up inside the gear case, and help adjust the vaporization process of the coolant. Any pressure regulators known to skilled artisans may be used. A tube like structure with a movable or adjustable piston, for example, may be connected to the interior of the gear case as a pressure regulator.

The gear assembly may be used in transmissions, transfer cases, and differentials in automobiles, trucks, aircrafts, and other machinery. Due to its improved energy efficiency and heat protection, the gear assembly can be made at a lighter weight, higher contact ratio and smaller profile. A gear assembly with a lower working temperature may also be implemented by using the gear oil comprising the coolant and the gear assembly construction as described above.

The above description of embodiments of the invention is merely exemplary in nature and, thus, variations thereof are not to be regarded as a departure from the spirit and scope of the invention.

What is claimed is:

1. A gear assembly comprising at least one pair of meshing gears situated inside a gear case having a sump portion and a wall portion constructed and arranged to provide a head space above the sump portion, and a gear oil mixture disposed in said sump portion; at least one of said gears being immersed at least partially in said mixture and said mixture comprising a base oil, and a coolant having an endothermic liquid/vapor transition between the lower and upper operating temperatures of the gear assembly, the coolant having a viscosity lower than the base oil, and a heat exchanger in an interior portion of the gear case constructed and arranged to fit in the head space, and the heat exchanger being constructed and arranged to condense coolant vapor into a liquid form.

2. A gear assembly as set forth in claim 1, wherein at least one of said meshing gears is of a hypoid or a helical gear type.

3. A gear assembly comprising at least one pair of meshing gears situated inside a gear case having a sump portion and a wall portion, and a gear oil mixture disposed in said sump portion; at least one of said gears being immersed at least partially in said mixture and said mixture comprising a base oil, and a coolant having an endothermic liquid/vapor transition between the lower and upper operating temperatures of the gear assembly, the coolant having a viscosity lower than the base oil, and further comprises a heat exchanger disposed in said wall portion and configured to condense the vapor of said coolant into a liquid and to return said liquid to the sump portion.

4. A gear assembly as set forth in claim 1, wherein said endothermic liquid/vapor transition occurs at a temperature between about 80° C. and about 200° C.

5. A gear assembly as set forth in claim 1, wherein the at least heat exchanger includes a section of said wall portion made of a heat conductive metal and having at least one of channels, dents, spikes or voids configured to condense the vapor of said coolant, conduct heat away from said gear assembly, and return the condensed liquid coolant to said sump portion.

6. A gear assembly as set forth in claim 1 further comprises a pressure regulator configured to adjust the pressure inside said gear case.

7. A gear assembly as set forth in claim 1 is an automotive differential gear box, rear axle gear box, or transmission gear box.

8. A method comprising: providing a gear assembly comprising at least one pair of meshing gears and a gear case having a sump portion and a wall portion constructed and arranged to provide a headspace above the sump portion; disposing in said sump portion a gear oil comprising a base oil, and a coolant having an endothermic liquid/vapor transition between the upper and lower operating temperatures of said gear assembly, and immersing at least one of said gears in said gear oil, said coolant having a viscosity lower than the base oil, and at least one of a heat exchanger in an interior portion of the gear case constructed and arranged to fit in the head space, or a plurality of fins extending from the exterior of the gear case.

9. A method as set forth in claim 8 further comprises: operating said gear assembly to allow at least a portion of said gears and/or sump portion to reach a temperature near said endothermic liquid/vapor transition temperature, causing said coolant to vaporize into the headspace of said gear case; condensing the coolant vapor in the headspace; returning the condensed coolant liquid to the sump portion; and mixing said condensed coolant liquid with said gear oil mixture in said sump portion through the rotating action of said gears.

10. A method comprising: providing a gear assembly comprising at least one pair of meshing gears and a gear case having a sump portion and a wall portion with a headspace and a heat exchanger disposed in said wall portion and configured to condense the vapor of said coolant into a liquid and to return said liquid to the sump portion; disposing in said sump portion a gear oil comprising a base oil, and a coolant having an endothermic liquid/vapor transition between the upper and lower operating temperatures of said gear assembly, and immersing at least one of said gears in said gear oil, said coolant having a viscosity lower than the base oil, wherein said wall portion comprising a heat conductive metal configured to condense the vapor of said coolant, conduct heat away from said assembly and return the condensed coolant liquid to said sump portion.

11. A method as set forth in claim 8, wherein said coolant is an organic alcohol having a heat of vaporization of at least 0.3 kJ/g.

12. A method as set forth in claim 8, wherein said gear assembly is an automotive differential gear box, rear axle gear box, or a transmission and at least one of said meshing gears is of a hypoid or helical gear type.

13. A gear assembly as set forth in claim 1 wherein the gear oil mixture is such that the gear oil mixture has a first viscosity at the contact point of the at least one pair of meshing gears when the coolant at the contact point is at a temperature below 80° C., and so that the gear oil mixture has a second viscosity at the contact point of the at least one pair of meshing gears when the coolant at the contact point is at a temperature between 80° C. and about 200° C. and is in the vapor phase, wherein the second viscosity is greater than the first viscosity.

14. A gear assembly as set forth in claim 1 wherein the gear oil mixture is such that the gear oil mixture has a first viscosity when the coolant is at a temperature below 80° C., and so that the gear oil mixture has a second viscosity when the coolant is at a temperature between 80° C. and about 200° C. and is in the vapor phase, wherein the second viscosity is greater than the first viscosity.

15. A gear assembly as set forth in claim 1 wherein the wall portion defines a headspace above the a gear oil mixture disposed in said sump portion so that the coolant may vaporize into the headspace and condense vapor of the coolant into a liquid and to return said liquid to the sump portion.

16. A gear assembly as set forth in claim 1 wherein the oil coolant mixture is such that coolant is vaporizable from the mixture at a temperature ranging from 80° C. and about 200° C.

17. A gear assembly as set forth in claim 1, wherein said coolant has a melting point of −40° C. or less, an endothermic boiling point of about 190° C. or less, and a heat of vaporization at boiling point of at least 0.25 kJ/g.

18. A gear assembly as set forth in claim 1, wherein said coolant is present in said mixture at about 0.1% to about 20% by weight.

19. A gear assembly as set forth in claim 1 further comprises at least one anti-wear and/or an extreme pressure additive.

20. A gear assembly as set forth in claim 1, wherein said coolant comprises a molecule having a polar group and a lipophilic group.

21. A gear assembly as set forth in claim 1, wherein said coolant comprises an organic alcohol.

22. A gear assembly as set forth in claim 1, wherein said coolant comprises at least one of diethylene glycol monobutyl ether, ethylene glycol monobutyl ether, diethylene glycol monoethyl ether, 1,2-butanediol, nonyl alcohol, dipropylene glycol n-butyl ether, dipropylene glycol methyl ether, dipropylene glycol monopropyl ether, propylene glycol methyl ether, propylene glycol n-butyl ether, propylene glycol propyl ether, isobutyl alcohol, 1-butanol, 2-chloroethanol, 1-hexanol, 1,2-propanediol, propylene glycol phenyl ether, ethylene glycol mono-propylether, diethylene glycol methyl ether, 4-methyl-2-pentanol, 1-methyl cyclohexanol, 2-methyl-1-pentanol, or n-pentanol.

23. A gear assembly as set forth in claim 1, wherein said coolant comprises at least one of propylene glycol methyl ether or diethylene glycol methyl ether.

24. A gear assembly as set forth in claim 1, wherein said coolant has a heat of vaporization of at least 0.3 kJ/g and a boiling point between about 80° C. to about 150° C.

25. A gear assembly as set forth in claim 1, wherein said coolant is present in said mixture at about 1.0% to about 20% by weight.

26. A gear assembly as set forth in claim 8, wherein said coolant is present in said mixture at about 1.0% to about 20% by weight.

27. A method comprising: providing a gear assembly comprising at least one pair of meshing gears and a gear case having a sump portion and a wall portion with a headspace; disposing in said sump portion a gear oil comprising a base oil, and a coolant having an endothermic liquid/vapor transition between the upper and lower operating temperatures of said gear assembly, and immersing at least one of said gears in said gear oil, said coolant having a viscosity lower than the base oil, and a coil filled with heat conductive fluid fit in the headspace of the gear case.

28. A gear assembly comprising at least one pair of meshing gears situated inside a gear case having a sump portion and a wall portion, and a gear oil mixture disposed in said sump portion; at least one of said gears being immersed at least partially in said mixture and said mixture comprising a base oil, and a coolant having an endothermic liquid/vapor transition between the lower and upper operating temperatures of the gear assembly, the coolant having a viscosity lower than the base oil, and a heat exchanger disposed in said wall portion and configured to condense the vapor of said coolant into a liquid and to return said liquid to the SUMP portion, and a plurality of fins extending from the exterior of the gear case.

29. A gear assembly as set forth in claim 1, wherein said coolant is present in said mixture at about 1.0% to about 10% by weight.

30. A gear assembly as set forth in claim 8, wherein said coolant is present in said mixture at about 1.0% to about 10% by weight.

31. A gear assembly comprising at least one pair of meshing gears situated inside a gear case having a sump portion and a wall portion, a heat exchanger disposed in said wall portion and configured to condense the vapor of said coolant into a liquid and to return said liquid to the sump portion, and a gear oil mixture disposed in said sump portion; at least one of said gears being immersed at least partially in said mixture and said mixture comprising a base oil, and a coolant having an endothermic liquid/vapor transition between the lower and upper operating temperatures of the gear assembly, the coolant having a viscosity lower than the base oil, the coolant comprising an alcohol having an ether group.

32. A gear assembly comprising at least one pair of meshing gears situated inside a gear case having a sump portion and a wall portion, a heat exchanger disposed in said wall portion and configured to condense the vapor of said coolant into a liquid and to return said liquid to the sump portion, and a gear oil mixture disposed in said sump portion; at least one of said gears being immersed at least partially in said mixture and said mixture comprising a base oil, and a coolant having an endothermic liquid/vapor transition between the lower and upper operating temperatures of the gear assembly, the coolant having a viscosity lower than the base oil, the coolant comprising at least one of diethylene glycol monobutyl ether, ethylene glycol monobutyl ether, diethylene glycol monoethyl ether, dipropylene glycol n-butyl ether, dipropylene glycol methyl ether, dipropylene glycol monopropyl ether, propylene glycol methyl ether, propylene glycol n-butyl ether, propylene glycol propyl ether, 1,2-propanediol, propylene glycol phenyl ether, ethylene glycol mono-propylether, or diethylene glycol methyl ether.

* * * * *